United States Patent
Beck et al.

(10) Patent No.: US 11,156,269 B2
(45) Date of Patent: Oct. 26, 2021

(54) TRANSMISSION, TRANSMISSION ASSEMBLY AND POWERTRAIN

(71) Applicant: ZF Friedrichshafen AG, Friedrichshafen (DE)

(72) Inventors: Stefan Beck, Eriskirch (DE); Raphael Himmelsbach, Friedrichshafen (DE); Michael Wechs, Weissensberg (DE); Philipp Rechenbach, Markdorf (DE); Johannes Kaltenbach, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/839,430

(22) Filed: Apr. 3, 2020

(65) Prior Publication Data

US 2020/0318713 A1 Oct. 8, 2020

(30) Foreign Application Priority Data

Apr. 5, 2019 (DE) ..................... 10 2019 204 909.5

(51) Int. Cl.
*F16H 1/32* (2006.01)
*H02K 7/108* (2006.01)
*F16H 3/66* (2006.01)

(52) U.S. Cl.
CPC ....... *F16H 3/66* (2013.01); *F16H 2200/0043* (2013.01); *F16H 2200/0086* (2013.01); *F16H 2200/2007* (2013.01); *F16H 2200/2012* (2013.01); *F16H 2200/2015* (2013.01); *F16H 2200/2035* (2013.01); *F16H 2200/2038* (2013.01); *F16H 2200/2043* (2013.01); *F16H 2200/2046* (2013.01)

(58) Field of Classification Search
CPC .................. F16H 2200/2053–2061; F16H 2200/2007–2017
See application file for complete search history.

(56) References Cited

U.S. PATENT DOCUMENTS 3,946,623 A * 3/1976 Murakami .............. F16H 3/666
475/276
5,106,352 A 4/1992 Lepelletier
(Continued)

FOREIGN PATENT DOCUMENTS

DE 690 10 472 T2 3/1995
DE 101 62 884 A1 7/2003
DE 10 2016 117 590 A1 6/2017

OTHER PUBLICATIONS

German Search Report Corresponding to 10 2019 204 909.5 dated Apr. 25, 2019.

*Primary Examiner* — Ernesto A Suarez
*Assistant Examiner* — Farhana Pervin
(74) *Attorney, Agent, or Firm* — Finch & Maloney, PLLC; Michael J. Bujold; Jay S. Franklin (57) ABSTRACT

A transmission, in particular a reducer transmission (34), which has two planetary sets and two shift elements (S1, S2). In addition, a transmission assembly which has a main transmission (32), of a planetary design, in particular a continuous power split transmission of a planetary design, and such a transmission which is coupled, as a reducer transmission (34), with the main transmission (32). Also, a powertrain (10) of a working machine with such a transmission assembly (30).

14 Claims, 9 Drawing Sheets

(56) References Cited

U.S. PATENT DOCUMENTS

| | | | |
|---|---|---|---|
| 5,342,258 A | 8/1994 | Egyed | |
| 8,360,928 B2* | 1/2013 | Tabata | F16H 3/66 |
| | | | 477/4 |
| 9,835,237 B2 | 12/2017 | Hwang et al. | |
| 2007/0063660 A1* | 3/2007 | Tabata | B60K 6/40 |
| | | | 318/66 |
| 2015/0267780 A1* | 9/2015 | Meyer | F16H 3/666 |
| | | | 475/279 |
| 2015/0377327 A1* | 12/2015 | Lee | F16H 3/728 |
| | | | 475/5 |
| 2016/0131227 A1* | 5/2016 | Beck | F16H 3/66 |
| | | | 475/275 |
| 2020/0182333 A1* | 6/2020 | Mellet | F16H 3/724 |

* cited by examiner

TRANSMISSION, TRANSMISSION ASSEMBLY AND POWERTRAIN

This application claims priority from German patent application no. 10 2019 204 909.5 filed Apr. 5, 2019.

FIELD OF THE INVENTION

The invention concerns a transmission, in particular a reducer transmission, a transmission assembly with a main transmission which is coupled with such transmission, and a powertrain of a work machine with such transmission assembly.

BACKGROUND OF THE INVENTION

Basically, such transmission, transmission assemblies are known in the state of the art for work machines which are equipped with such powertrains.

A work machine is for instance understood as an agricultural work machine, such as a tractor or a construction work machine, such as a wheel loader.

In this context, the transmissions which are designed as reducer transmissions are also often called section transmissions, if they are meant to increase the spread of a main transmission. The section transmission has hereby a certain number of gear ratios steps through which the number of the shiftable gears or drive ranges for the main transmission can be multiplied. Alternative terms for the section transmissions are range group, reducer group, or range-transmission.

Also, transmissions which are designed as reducer transmissions can serve for the creation of forward gears or forward drive ranges, and reverse gears or reverse drive ranges. One also speaks hereby about turning units, reversal units, or reversing units.

Also known is the combination of a reversing unit with a section group. Such transmission over at least two forward drive ranges or forward gears and a reverse drive range or reverse gear, or vice versa.

The entire unit of the main transmission and reducer transmission can also be called a group transmission.

Starting with a main transmission, reducer transmissions are generally positioned along the transmission axis of the main transmission, next to the main transmission, so that the axial construction space requirement of this transmission group, starting with the main transmission, is increased. However, the aim is to construct the transmissions as very compact which applies in particular to the axial construction length of transmissions. This is mainly important in an electric-mechanical power split transmissions where for instance construction space needs to be provided for the electric machine.

SUMMARY OF THE INVENTION

It is therefore the object of the invention to create a transmission, in particular a reducer transmission, with an especially short axial construction length. Hereby, a transmission assembly, which is equipped with such reducer transmission, can also be axially compact. Thus, the total construction space requirement of a powertrain is reduced which comprises such a transmission assembly. It is understood that the axial compactness cannot be achieved at the expense of the remaining transmission functions. One of the most important transmission functions is hereby the provision of operating ranges which are also called drive ranges in driving work machines.

The task is achieved through a transmission in the above mentioned design, in particular a reducer transmission, which has a first input shaft which can be coupled with the main transmission, a second input shaft, which can be coupled with the main transmission a primary planetary gear set, in the direction of the power flow, with the primary sun gear, a primary planet carrier, at least a primary planetary gear and a first primary planetary gear set element, a secondary planetary gear set, following the primary planetary gear set in the power flow direction, with a first secondary planetary gear set element, and a second secondary planetary gear element, and a third secondary planetary gear set element, at least a first shift element, and a second shift element, and an output shaft, whereby the first input shaft is connected rotationally fixed to the primary sun gear, whereby the second input shaft is connected rotationally fixed to the primary planet carrier, whereby the primary planet carrier is connected rotationally fixed to the second secondary planetary gear set element, whereby the output shaft is connected rotationally fixed to the second secondary planetary gear set element, whereby the first primary planetary gear set element is connected rotationally fixed to the first secondary planetary gear set element, whereby the first primary planetary gear set element is torque proof coupled through the first shift element optionally with the transmission enclosure, whereby the third secondary planetary gear set element is torque proof coupled through the second shift element optionally with the transmission enclosure.

In this context, a shift element is to be understood as a common term for brakes and clutches, whereby brakes are always acting relative to the transmission enclosure, and clutches always couple two rotatable parts. Hereby the first shift element and the second shift element are therefore designed as brakes. Such a transmission is axially comparatively compact, because planetary gear sets are exclusively used. These are particularly well suited for realizing gears that can transmit high torques but still require little, especially axial, space. The direction of power flow is defined here in traction mode.

The previously mentioned transmission has a transmission axis which corresponds to the central axis of the planetary gear sets. The power flow is thus also oriented along this transmission axis during pull operation. In addition, the first input shaft and the output shaft are positioned preferably on the transmission axis.

Through engagement of the first shift element, such a transmission creates a forward gear or forward drive range, and through engagement of the second shift element, a reverse gear or reverse drive range is created. The transmission presents therefore a reversing unit through which, for instance, the direction of the drive range can be reversed.

The operating ranges of transmissions are called drive ranges in the present documents. However, this in not intended to imply that only transmissions are meant which are related to a drive train. Transmissions are rather explicitly meant which do not perform that task. It is therefore understood that all mentioned drive ranges are meant in the broader sense as operating ranges.

Basically, the particular input shafts can actively be driven or just serve as a bearing axis.

In accordance with one embodiment, the second planetary gear set is a minus planetary gear set, the second secondary planetary gear set element is a secondary planet carrier and the third secondary planetary gear set element is a secondary ring gear. A planetary gear set is a minus planetary gear set if both same-axis central wheels, meaning the ring gear and the first secondary planetary gear set element, which can be designed as sun gear, have opposite rotational directions when the planet carrier is stationary. Thus, a standing gear ratio of the transmission is negative.

Alternatively, the secondary planetary gear set is a plus planetary gear set, the second secondary planetary gear set element is a secondary ring gear and the third secondary planetary gear set element is a secondary planet carrier. A planetary gear set is a plus planetary gear set when both, the same-axis central gears, meaning the ring gear and the first secondary planetary gear set element, which can be designed as sun gear, and have the same rotational direction during when the planet carrier stationary. The stationary gear ratio is hereby positive. A plus planetary gear set always has two planetary groups, that is to say has at least one inner planetary gear and one outer planet gear, which are coupled to a common planet carrier.

In accordance with a variation, the primary planetary gear set and the secondary planetary gear set are positioned axially next to each other along the transmission axis, whereby the first primary planetary gear set is a primary ring gear and the first secondary planetary gear set element a secondary sun gear. In this case it is called an axial nesting of the planetary gear set. Hereby, less construction space requirement, in particular axially, is achieved without a negative influence on the remaining transmission functionalities. In particular, a small construction space requirement can be combined with the same amount of gear steps or drive ranges. Such a transmission is also compact in a radial direction.

The primary planetary gear set and the secondary planetary gear set can also be nested in reference to the transmission axis, whereby the first primary planetary gear set element and the first secondary planetary gear set element creates an inner ring gear. Hereby, a particularly short construction length is achieved in the axial direction. It mainly matches the axial length of a single planetary gear set.

Alternatively hereto, the first primary planetary gear set element and the first secondary planetary gear set element together can create a gear wheel which couples both planetary gear sets, which is positioned as an additional planet between the two resulting planetary gears of the nested planetary gear sets and which meshes with them.

Radial nesting is best explained based on the variation with axially nested planetary gear sets. As explained previously, the primary ring gear is connected rotationally fixed to the secondary sun gear, and the primary planet carrier with the secondary planet carrier. Hereby, the secondary planetary gear set, by maintaining these couplings, is moved to a radial, outer side of the primary planetary gear set, meaning an axial direction of the primary planetary gear set, to then be positioned radially at the outside. Hereby, the original primary ring gear which was positioned previously radially at the outside and the original secondary sun gear can create together an inner ring gear of the radially nested planetary gear set, because the previously secondary sun gear is positioned radially outside of the previously primary ring gear. The inner ring gear is an annular gear that cooperates on the inside with at least one planet gear that results from the primary planetary gear set and on the outside with at least one planet gear that results from the secondary planetary gear set. For this purpose the inner ring gear has internal teething as well as an outer teething. The original secondary ring gear remains a ring gear for the radially nested planetary gear set. In other words, the original secondary ring gear encloses the radially nested planetary gear set in the radial direction.

In a radially nested transmission, the first and the second shift element can be positioned on the same axial side of the nested planetary gear sets. Alternatively, the two shift elements can each be positioned on opposite sides. Through these alternatives, the transmission can easily be matched with an available construction space.

Advantageously, the first shift element and the second shift element, in reference to the transmission axis, are nested radially one inside the other, in particular whereby the first shift element is positioned radially within the second shift element. The shift element can hereby be designed as a so-called double shift element. Thus, a reduced construction space requirement can be achieved. In the case that the first shift element and the second shift element are designed as multi-disc brakes, they can use of this configuration a common multi-disc carrier, which simplifies the construction of the transmission and further reduces the space requirement.

Alternatively or in addition, the first shift element and/or the second shift element can be positioned along the transmission axis, between the primary planetary gear set and the secondary planetary gear set. This configuration of the shift elements also creates a low construction space requirement.

In a design alternative, the first switching element and the second switching element are connected to the transmission housing via a respectively assigned partition wall or a common partition wall. The provision of enclosure partition walls makes it possible to position the shift elements flexibly in the transmission space. Therefore, the shift elements can be positioned in such a way that a reduced construction space requirement of the transmission is achieved as a whole. The arrangement can also be easily adapted to an existing installation space via such an arrangement. Likewise, by providing the shifting elements on an intermediate wall of the housing, it is possible to arrange them favorably with regard to the torque flow within the transmission. This means in particular that the shift elements are positioned in a way that, in an engaged condition, they need to hold a possible low torque. Thus, the shift elements can be designed as compact which has a positive impact regarding the construction space requirement of the transmission. The enclosure partition walls themselves have only a small axial dimension, which is negligibly small compared to the axial dimension of the shift elements.

A third shift element is provided in an embodiment, through which the primary planet carrier can be coupled optionally with the primary sun gear, the primary sun gear can be optionally connected rotationally fixed with the first primary planetary gear set element, the primary planet carrier can be optionally connected rotationally fixed with the first primary planetary gear set element, the primary planet carrier can be optionally connected rotationally fixed with the third secondary planetary gear set element, or the first primary planetary gear set element can be connected rotationally fixed to the third secondary planetary gear set element.

Thus, the primary planetary gear set can be blocked by the third shift element. This results in an additional forward gear or forward drive range because the primary planetary gear set has no gear ratio function in the locked condition. The transmission presents now a combined reducer group and reversing unit. Also, such a transmission can be referred to as a reducer group with an integrated reversing unit. Due to the two forward drive ranges, the amount of provided drive ranges through the main transmission can be doubled. Also, the construction space requirements remain low with the third shift element.

The third shift element is positioned in particular at one main transmission side of the transmission, which is designed as a reducer transmission. Expressed differently, the third shift element is positioned at the input side.

In addition, the objective is achieved by a transmission assembly of the type mentioned above which has a main transmission in a planetary design, in particular a continuous power split transmission in planetary construction, and a transmission according to the invention which is coupled with the main transmission as a reducer transmission. Such a transmission assembly has a small construction space requirement. In particular, this applies to the axial construction length. The inventive transmission, which is designed as a reducer transmission, contributes to this. The above effects and advantages apply accordingly. Furthermore, the design of the main gear as a planetary gear results in a small axial space requirement.

Preferably, the main transmission has a main transmission-input shaft, a tertiary planetary gear set with a tertiary sun gear, a tertiary planet carrier, at least a third planetary gear in a tertiary ring gear, a quaternary planetary gear set with a quaternary sun gear, a quaternary planet carrier, at least a quaternary planetary gear and a quaternary ring gear, a fourth shift element, a fifth shift element, and a sixth shift element and at least two adjustment units each of which are is operatively connected to at least one of the planetary gear sets of the main transmission. Hereby, the terms "tertiary" and "quaternary" are only to be understood in the sense of a description of the assigned planetary gear sets, which are also used for the planetary gear sets of the transmission which are also used for the planetary gear sets of the transmission designed as a reducer transmission, which have for the designations "primary" and "secondary" to distinguish them. The number of planetary gear sets shall not be implied by these terms. The main transmission has at least two planetary gear sets, namely the planetary gear sets described here as tertiary and quaternary, although they are the first and the second planetary gear sets of the main transmission. The same applies for the shift elements that are labeled "fourth", "fifth", and "sixth". The adjustment units can be hydraulic or electric, so that a mechanical-hydraulic, or mechanical-electric power split transmission results. This is compact in structure due to the previously described effects.

In accordance with one embodiment, the main transmission-input shaft is connected rotationally fixed to the quaternary planet carrier, the first adjustment unit is connected rotationally fixed to the tertiary sun gear and the quaternary sun gear, the second adjustment unit is connected rotationally fixed to the tertiary planet carrier, the tertiary ring gear is connected rotationally fixed to the quaternary planet carrier, the second adjustment unit can be optionally coupled through the fourth shift element with the primary planet carrier, the quaternary ring gear can be optionally connected in a rotationally fixed manner via the fifth shift element with the primary sun gear, and the second adjustment unit can be optionally connected in a rotationally fixed manner via the sixth shift element with the primary sun gear. A transmission group is hereby created through which four forward drive ranges and two reverse drive ranges can be realized. By referencing these drive steps, the transmission is compact constructed.

A first forward drive range is hereby realized when the first shift element and the six shift element are engaged. All remaining shift elements are not engaged at that time.

A second forward drive range is created when the first shift element and the fifth shift element are engaged and all remaining shift elements or disengaged.

A third forward drive range is selected when the fourth shift element and the fifth shift element are engaged, and all remaining shift elements are disengaged.

A fourth forward drive range is selected when the third shift element and the third shift element are re-engaged and all remaining shift elements are disengaged.

A first reverse drive range is realized when the second shift element and the sixth shift element are engaged. All remaining shift elements are disengaged at that time.

A second reverse drive range is selected when the second shift element and the fifth shift element are engaged and the remaining shift elements are disengaged.

It is provided in another embodiment that the main transmission comprises a quinary sun gear, a quinary ring gear, a quinary planet carrier, and at least a quinary planetary gear, whereby the main transmission-input shaft is connected rotationally fixed to the tertiary ring gear and the quaternary planet carrier, whereby the quaternary sun gear and the quinary sun gear are rotationally fixed to each other, whereby the first adjustment unit is connected rotationally fixed to the main transmission-input shaft, whereby the second adjustment unit is connected rotationally fixed to the tertiary sun gear, whereby the tertiary planet carrier is connected rotationally fixed to the quaternary ring gear and the quinary planet carrier, whereby the quinary planet carrier, the quaternary ring gear and/or the tertiary planet carrier can be optionally connected in a rotationally fixed manner via the fourth shift element with the primary planet carrier, whereby the quinary sun gear can be optionally connected in a rotationally fixed manner via the fifth shift element with the primary sun gear, and whereby the quinary ring gear can be optionally connected rotationally fixed to the primary sun gear. This transmission assembly allows again the realization of the drive ranges which were described in the previous embodiment, meaning four forward drive ranges and two reverse drive ranges. Based on the entire functionality, the transmission is very compact.

In this transmission assembly along the transmission axis, the planetary gear sets are preferably positioned in the order of tertiary planetary gear set, quaternary planetary gear set, primary planetary gear set, secondary planetary gear set, in particular whereby the quinary planetary gear set is positioned between the quaternary and the primary planetary gear set. Thus, the clutches between the components of the individual planetary gear sets can be space-saving realized. Also, such a constructed transmission assembly is advantageously designed regarding the power flow, so that the power flow, in particular, is mainly oriented without reflux from the input shaft to the output shaft.

In addition, the objective is achieved through a powertrain of a work machine, in the art as mentioned before, which has an inventive transmission assembly and in particular a powertrain of a mobile work machine. Due to the already explained compactness of the transmission assembly, the result is a drive train in which there is sufficient space for electrical machines, which are present in particular in the case of electrical-mechanical power split transmissions and must be integrated into the drive train.

BRIEF DESCRIPTION OF THE DRAWINGS

The invention is described based on different embodiments which are shown in the attached drawings. These show.

DETAILED DESCRIPTION OF THE PREFERRED EMBODIMENTS

Figure 1:
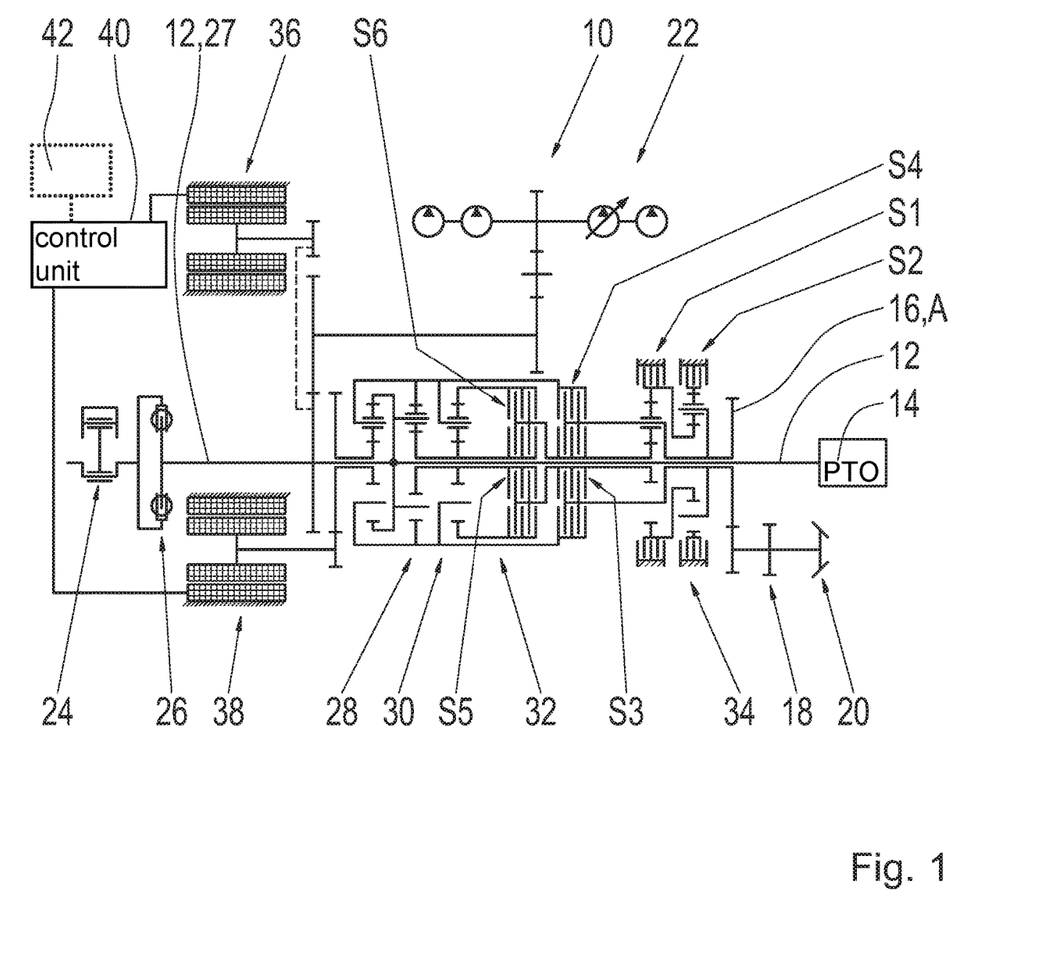
FIG. 1 a powertrain according to the invention with a transmission assembly according to the invention and transmission according to the invention which is designed as a reducer transmission.

FIG. 1 shows a powertrain 10 for a mobile work machine.

It serves on one hand to drive a power take off for which a power take off transmission 14 is provided. On the other hand, the powertrain 10 serves as traction drive for the mobile work machine. An output shaft 16 is provided for this.

By way of the output shaft 16, a front wheel drive 18 and a rear wheel drive 20 can be supplied with power in the form of a rotational speed and torque.

In addition, the drive train 10 is used to drive additional aggregates and pumps which are just schematically shown in FIG. 1 and marked with the reference character 22.

As energy source for the drive train 10 serves a drive motor 24 which is presently shown schematically as a combustion engine. It drives a main transmission-input shaft 12 via a vibration absorber 26.

In the presented embodiments, the main transmission-input shaft 12, as well as the output shaft 16, are positioned on a transmission axis 27.

The main transmission input shaft 12 and the output shaft 16 are interposed by an infinitely adjustable, mechanical-electrical power split transmission 28.

The mechanical branch or power branch of this power split transmission 28 comprises a transmission assembly 30 which itself has again a main transmission 32 and a reducer transmission 34.

The reducer transmission 34 is connected via a first input shaft E1 and a second input shaft E2 to the main transmission 32.

The electrical branch or electrical power branch of the power split transmission 28 has a first adjustment unit 36 and a second adjustment unit 38, which each are designed as electrical machines and can be electrically coupled with each other.

The two adjustment units 36, 38 are coupled in addition via a control unit 40 with an electrical storage unit 42.

Figure 2:
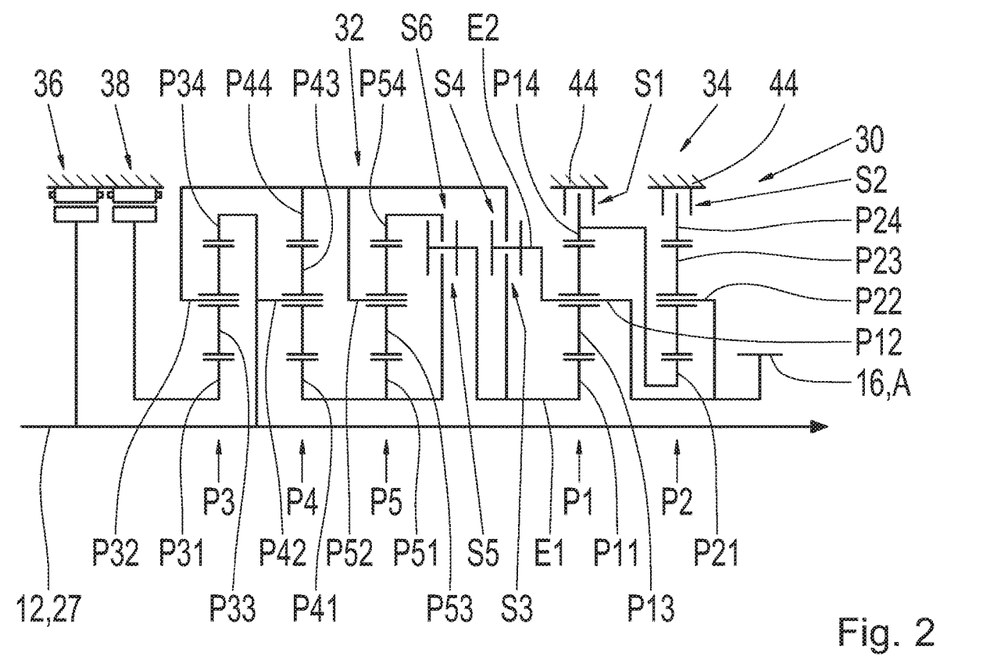
FIG. 2 the transmission assembly in FIG. 1 in a detailed view.

The transmission assembly 30, which comprises the main transmission 32 and the reducer transmission 34, is presented in detail in FIG. 2.

The reducer transmission 34 is hereby coupled via a first input shaft E1 and a second input shaft E2 with the main transmission 32 and has a primary planetary gear set P1 and a secondary planetary gear set P2.

An output shaft A of the reducer transmission 34 corresponds to the output shaft 16.

The main transmission 32 comprises a tertiary planetary gear set P3, a quaternary planetary gear set P4 and a quinary planetary gear set P5.

In the direction of power flow, i.e., from the main transmission input shaft 12 to the output shaft 16, the planetary gear sets are arranged in the order of the tertiary planetary gear set P3, the quaternary planetary gear set P4, the quinary planetary gear set P5, the primary planetary gear set P1, and the secondary planetary gear set P2, as is clear from FIG. 2.

With reference to the reducer transmission 34, the primary planetary gear set P1 comprises a primary sun gear 11, a primary planet carrier P12, a primary planet gear P13, and a first primary planetary gear set element P14 which is designed as a ring gear, in accordance with the embodiment in FIGS. 1 and 2.

The secondary planetary gear set P2 is designed in the embodiment of the FIGS. 1 and 2 as a so-called minus planetary gear set. It has a first secondary planetary gear set element P21, which is here a secondary sun gear. Also, it comprises a second, secondary planetary gear set element P22, which is here a secondary planet carrier. The secondary planet carrier P2 has also a secondary planet gear P23 and a third secondary planetary gear set element P24 which is here designed as a secondary ring gear, meaning a ring gear of the secondary planetary gear set P2.

In reference to the main transmission 32, the tertiary planetary gear set P3 comprises a tertiary sun gear P31, a tertiary planet carrier P32, a tertiary planet gear P33, as well as a tertiary ring gear P34.

The quaternary planetary gear set P4 has a quaternary sun gear P41, a quaternary planet carrier P42, a quaternary planet gear P43, as well as a quaternary ring gear P44.

The quinary planetary gear set P5 has a quintery sun gear P51, a quinary planet carrier P52, a quinary planet gear P53, as well as a quinary ring gear P54.

The previously mentioned elements of the transmission assembly 30 are coupled with each other as follows.

The first adjustment unit 36 is connected rotationally fixed to the main transmission input shaft 12 and the second adjustment unit 38 is connected rotationally fixed to the tertiary sun gear P31.

The tertiary ring gear P34 is connected rotationally fixed to the quaternary planet carrier P42, as well as to the main transmission input shaft 12.

The quaternary sun gear P41 is connected rotationally fixed to the quinary sun gear P51.

The quinary planet carrier P52 is connected rotationally fixed to the quaternary P44 ring gear and the tertiary planet carrier P32.

The quaternary sun gear P41 and the quinary sun gear P51 are optionally coupled with the primary sun gear 11.

The quinary ring gear P54 can optionally be rotatably coupled to the primary sun gear P11 via a sixth shift element S6.

The assembly based on the tertiary planet carrier P32, the quaternary ring gear P44 and the planet carrier P52, can be optionally connected rotationally fixed to the primary planet carrier P12 by means of a fourth shift element S4.

Also, the primary sun gear P11 can also optionally be rotatably to the planet carrier P12 via a third shift element S3.

The primary ring gear P14 can be connected in a rotationally fixed manner, via a first shift element S1, to a transmission enclosure 44.

Furthermore, the primary ring gear P14 is connected rotationally fixed to the first secondary planetary gear set element P21, which is here designed as secondary sun gear, meaning the sun gear of the secondary planetary gear set P2.

The primary planet carrier P12 is connected rotationally fixed to the second secondary planet carrier element P22, meaning the secondary planet carrier, and the output shaft 16, A.

The third secondary planet gear set element P24, here the secondary ring gear, can optionally be rotatably connected to the transmission housing 44 by means of a second shift element S2.

Figure 3:
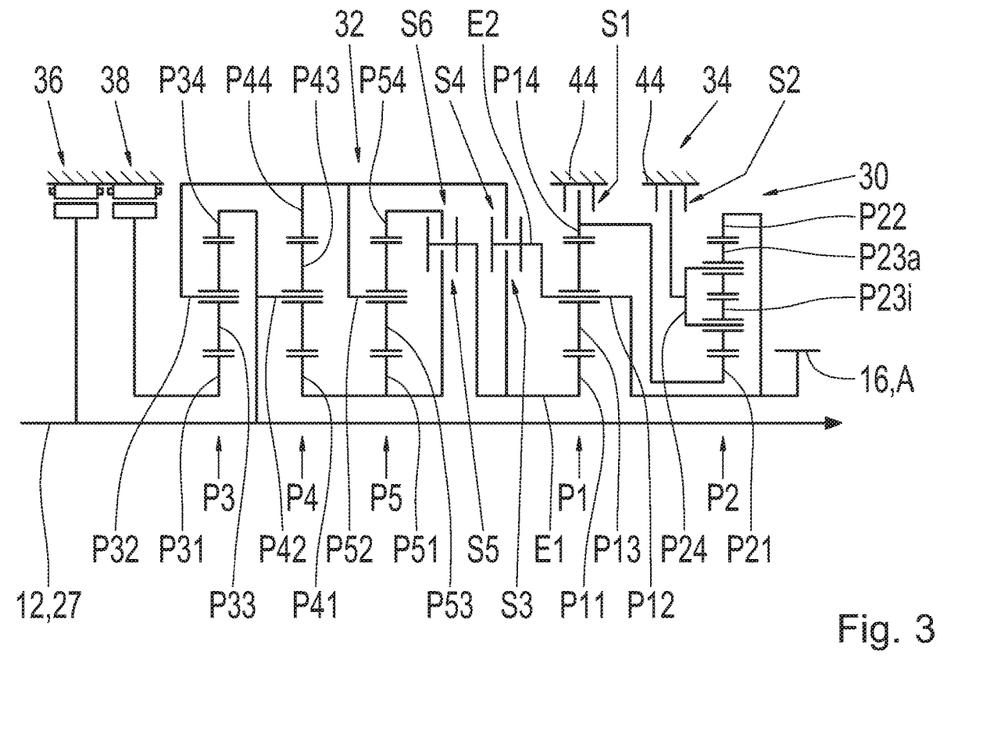
FIG. 3 an alternative embodiment of the transmission assembly according to the invention whereby, in reference to the transmission assembly in FIG. 2, just another reducer transmission is used, FIG. 4 another alternative embodiment of the transmission assembly according to the invention whereby, in reference to the transmission assemblies in FIGS. 2 and 3, just another reducer transmission is used, FIG. 5 a shifting schematic which applies to the transmission assemblies in FIGS. 2 to 4, FIG. 6 an alternative transmission assembly according to the invention, different to FIGS. 1 to 4, whereby in reference to the transmission assembly in FIG. 2, just the different main transmission is used, FIG. 7 an additional alternative transmission assembly, whereby the main transmission in FIG. 6 is combined with the reducer transmission in FIG. 3, FIG. 8 an additional alternative transmission assembly, whereby the main transmission in FIGS. 6 and 7 is combined with the reducer transmission in FIG. 4, FIG. 9 a transmission assembly according to the invention, whereby the reducer transmission in FIG. 2 is coupled with an arbitrary main transmission, FIG. 10 a transmission assembly according to the invention, whereby the reducer transmission in FIG. 4 is coupled with an arbitrary main transmission, FIG. 11 a transmission assembly according to the invention, whereby the reducer transmission in FIG. 3 is coupled with an arbitrary main transmission, FIG. 12 a shift schematic which refers to the reducer transmissions in FIGS. 9 to 11, FIGS. 13 to 18 transmission assemblies according to the invention, whereby the reducer transmissions are designed in accordance with additional embodiments and which are coupled with an arbitrary main transmission, FIG. 19 shifting schematics which reference the reducer transmissions in FIGS. 17 and 18.

FIG. 3 shows an additional embodiment of the transmission assembly 30.

This differs from the embodiment in FIG. 2 only with regard to the reducer transmission 34. Therefore, it is only these differences that are discussed below.

The secondary planetary gear set P2 is here designed as a plus planetary gear set.

Accordingly, instead of the secondary planet gear P23, it comprises an inner planet gear P23$i$ and an outer planet gear P23$a$.

The third secondary planetary gear set element P24 is here a secondary planet carrier and is designed so as to accommodate both planetary gears P23$i$ and P23$a$.

Furthermore, the second secondary planetary gear set element P22 is now a secondary ring gear which is connected in a rotationally fixed manner to the output shaft 16, A.

The third secondary planetary gear set element P24, meaning the secondary planet carrier, can be optionally connected to the transmission housing 44 in a rotationally fixed manner via the shift element S2.

Apart from that, reference is made to description of the embodiment according to FIG. 2.

Figure 4:
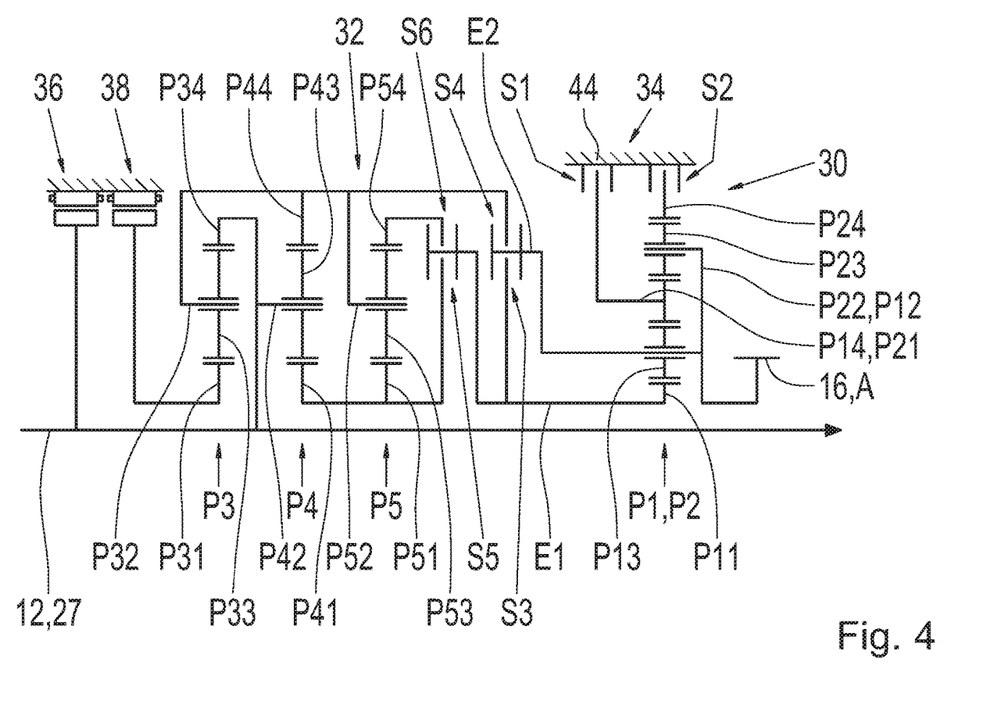

The embodiment of the transmission assembly 30 shown in FIG. 4 also differs from the embodiment shown in FIG. 2 only with regard to reducer transmission 34. It is therefore explained based on the embodiment according to FIG. 2.

In the embodiment according to FIG. 4, the primary planetary set P1 and the secondary planetary set P2 a radially nested.

This means that, starting from the embodiment shown in FIG. 2, in which the primary planetary set P1 and the secondary planetary set P2 are arranged axially adjacent, the couplings between the primary planetary gear set P1 and the secondary planetary gear set P2 are the same, but the secondary planetary gear set P2 has been shifted to a position radially outside of the primary planetary gear set P1.

In this context, the primary sun gear P11 now represents the sun gear of the nested planetary sets P1, P2.

The primary planet gear P13 meshes with this radially to the outside (compare FIG. 2).

Again, radially to the outside, there is an inner ring gear, for instance, which is created by a combination of the first primary planetary gear set element P14, which is formed in FIG. 2 as the primary ring gear, and the first secondary planetary gear set element P21, which is formed in FIG. 2 as a secondary sun gear, as a result of the radial nesting.

This is followed radially outside by the secondary planet gear P23 (see FIG. 2).

The third secondary planetary gear set element P24, which is a ring gear of the nested planetary gear sets, connects further radially outward.

In other words, the previously first primary planetary gear set element P14 and the previously first secondary planetary gear set element P21 together form an inner ring gear which has an inner teething and an outer teething.

Alternatively to the inner ring gear, the previously first primary planetary gear set element P14 and the previously first secondary planetary gear set element P21 can together form a gear wheel which is positioned between the two planet gears P13, P23, meaning between the primary planet gear P13 and the secondary planet gear P23.

Figure 5:
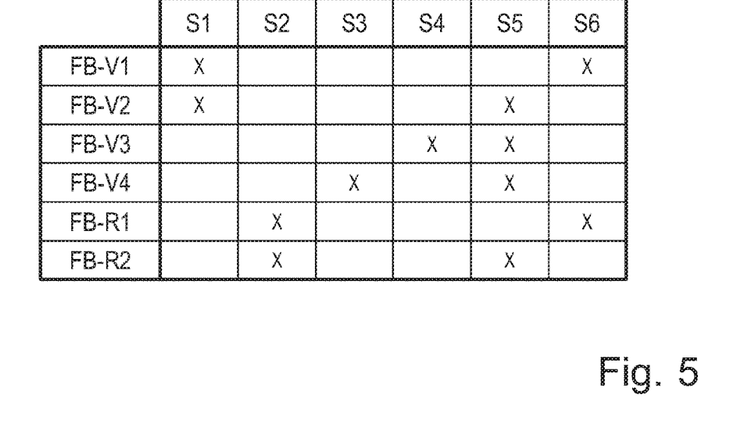

The shifting schematic shown in FIG. 5 can be implemented with the transmission assemblies 30 of FIGS. 1 to 4.

Altogether, four forward drive ranges can now be realized, which are marked as FB-V1 to FB-V4, and two reverse drive ranges, which are marked as FB-R1 and FB-R2.

Hereby, a first forward drive range FB-V1 is implemented when the first shift element S1 and the sixth shift element S6 are engaged. All remaining shift elements are disengaged.

A second forward drive range FB-V2 is implemented when the first shift element S1 and the fifth shift element S5 are engaged. All remaining shift elements are disengaged.

A third forward drive range FB-V3 is implemented when the fourth shift element S4 and the fifth shift element S5 are engaged. All remaining shift elements are disengaged.

A fourth forward drive range FB-V4 is implemented when the third shift element S3 and the fifth shift element S5 are engaged. All remaining shift elements are disengaged.

A first reverse drive range FB-R1 is implemented when the second shift element S2 and the sixth shift element S6 are engaged and the remaining shift elements are disengaged.

A second reverse drive range FB-R2 is implemented when the second shift element S2 and the fifth shift element S5 are engaged and the remaining shift elements are disengaged.

Figure 6:
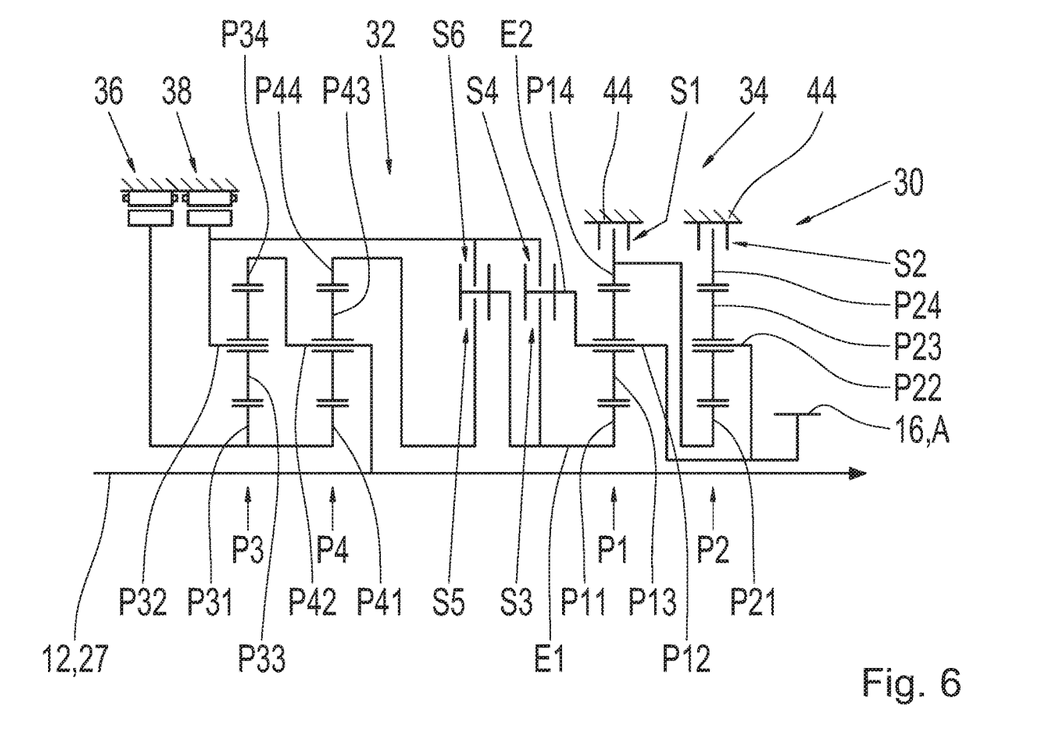

An additional embodiment of the transmission assembly 30 is shown in FIG. 6. It also comprises a main transmission 32 and a reducer transmission 34.

The reducer transmission 34 used in the embodiment according to FIG. 6 corresponds to the reducer transmission 34 used in the embodiment according to FIG. 2. Reference is made to the comments thereof.

The main transmission 32, however, differs from the main transmission 32 of the embodiments in FIGS. 1 to 4. It is understood that the transmission assembly 30 according to the embodiment in FIG. 6 can be integrated into the powertrain 10 instead of the transmission assembly 30 shown in FIG. 1.

The main transmission 32 of the transmission assembly 30, in accordance with FIG. 6 comprises, and different to the main transmission 32 shown FIG. 1 to 4, just two planetary gear sets, namely the tertiary planetary gear set P3 and the quaternary planetary gear set P4. Insofar, the previously provided quinary planetary gear set is no longer provided, which was provided between the quaternary planetary gear set P4 and the reducer transmission 34.

The elements of the tertiary planetary gear set P3 and of the quaternary planetary gear set P4 are named with the same system that was used for the description of FIG. 2 to 4. However, these elements are now coupled with each other differently.

The first adjustment unit 36 is connected rotationally fixed to the tertiary sun gear P31 and the quaternary sun gear P41.

The second adjustment unit 38 is connected rotationally fixed to the tertiary planet carrier P32.

The main transmission-input shaft 12 is connected rotationally fixed to the quaternary planet carrier P42.

Furthermore, the tertiary ring gear P34 is connected rotationally fixed to the quaternary planet carrier P42.

The second adjustment unit 38 and therefore also the planet carrier P32, which is connected to it in a rotationally fixed manner, can optionally be connected rotationally fixed to the primary planet carrier P12 via the fourth switching element S4.

Through the fifth shift element S5, the quaternary ring gear P44 can optionally be connected rotationally fixed to the primary sun gear P11.

Furthermore, the second adjustment unit 38 and the tertiary planet carrier P32 can optionally be connected rotationally fixed to the sun gear P11 via the sixth shift element S5.

Also, the primary sun gear P11 can optionally be connected in a rotationally fixed manner to the primary planet carrier P12 via the third shift element S3.

Figure 7:
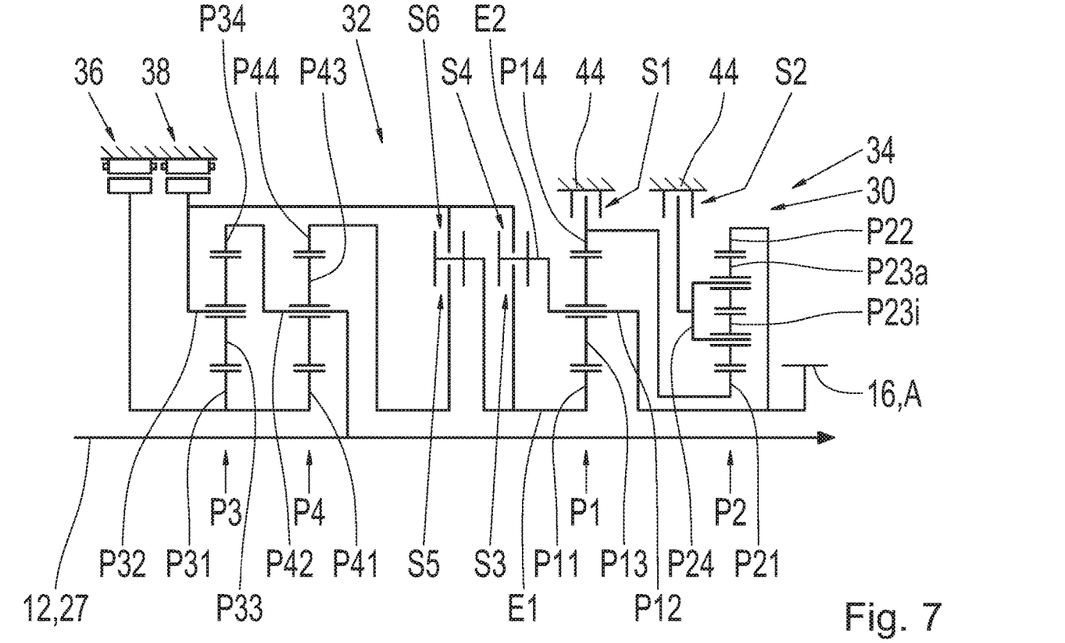

FIG. 7 shows an additional embodiment of the transmission assembly 30, the main transmission 32 corresponds to the main transmission 32 of FIG. 6. The reducer transmission 34 corresponds to the reducer transmission 34 of FIG. 3. Reference is therefore made to the descriptions of the above described embodiments.

Figure 8:
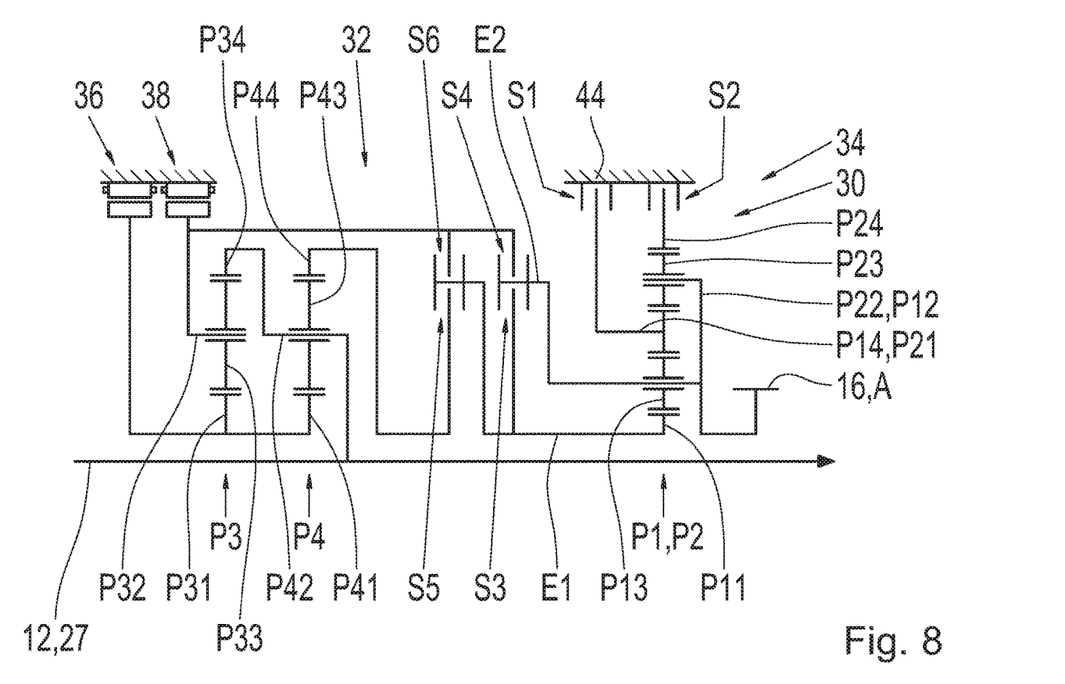

FIG. 8 also shows an alternative transmission assembly 30, the reducer transmission 34 of which corresponds to the reducer transmission 34 in FIG. 4, and the main transmission 32 is identical to the main transmissions 32 from FIGS. 6 and 7. Therefore, reference is made to the above descriptions.

The shifting schematic of FIG. 5 is also valid for the variants of the transmission assembly 30 which are presented in FIGS. 6 to 8. It is therefore also possible to implement these four forward drive ranges and two reverse drive ranges. Therefore, refer to the above descriptions.

In the FIGS. 9 to 11 explained below, additional variations of the transmission assembly 30 are introduced.

The only thing described in these is the design of the reducer transmission 34. It can be coupled with an arbitrary main transmission 32, i.e., the main transmission shown in FIGS. 1 to 4, and 6 to 8. Therefore and in reference to FIG. 9 to 11, only the reducer transmission 34 is described.

Figure 9:
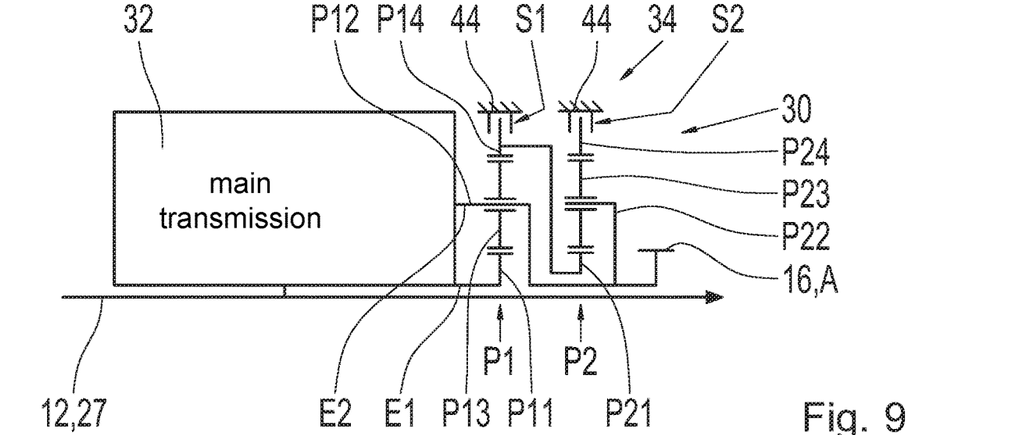

The reducer transmission 34, in accordance with the embodiment of FIG. 9, corresponds to the previously described reducer transmission 34 as in FIG. 2. Therefore, reference is made to the related description.

In the embodiment according to FIG. 10, the reducer transmission 34 corresponds to the reducer transmission 34 which has already been explained with reference to FIG. 4. Referenced to these description.

Figure 11:
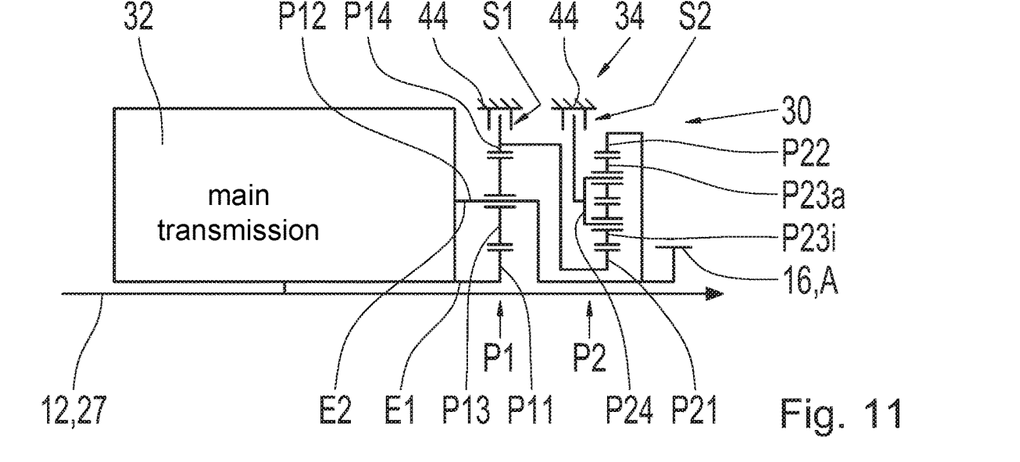

In the embodiment in accordance with FIG. 11, the reducer transmission 34 is identical to the reducer transmission 34 in FIG. 3. Therefore, reference is made to the corresponding descriptions.

Figure 10:
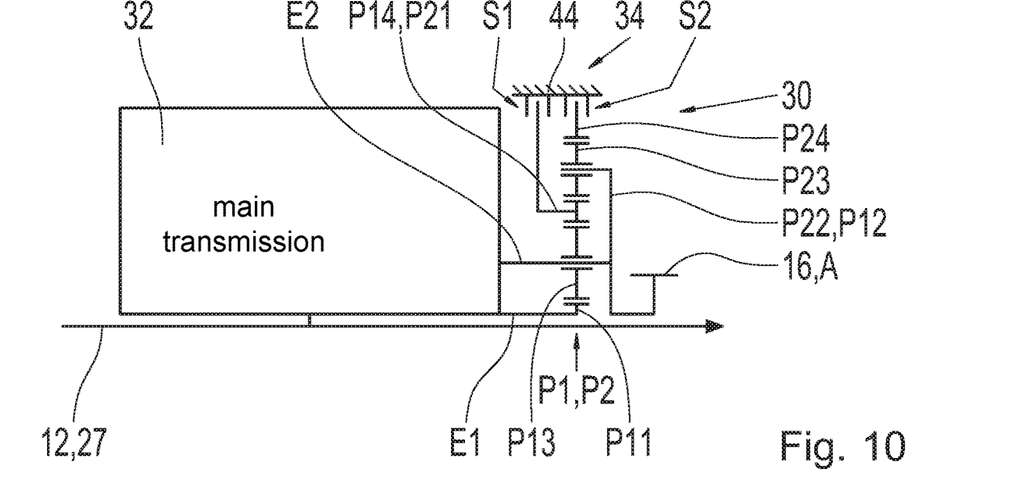

The reducer transmissions 34 from FIGS. 9 to 11 are each designed as reversing units, meaning that in each case a forward drive range FB-V and a reverse drive range FB-R can be realized by means of this reducer transmission 34. The associated shift schematic can be seen in FIG. 12.

Figure 12:
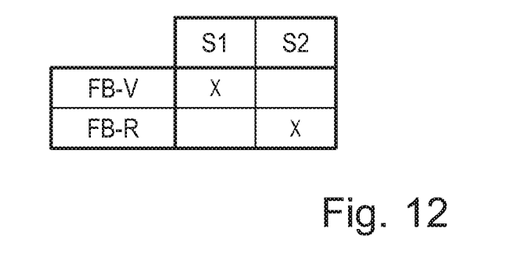

Therefore, the forward drive range FB-V is implemented if the first shift element S1 is engaged and the second shift element S2 is disengaged.

The reverse drive range FB-R is implemented if the first shift element S1 is disengaged and the second shift element S2 is engaged.

FIGS. 13 to 16 show additional embodiments of the transmission assembly 30. Any main transmission 32 can again be used, in particular the main transmissions 32 as in FIGS. 1 to 4, and 6 to 8.

Figure 13:
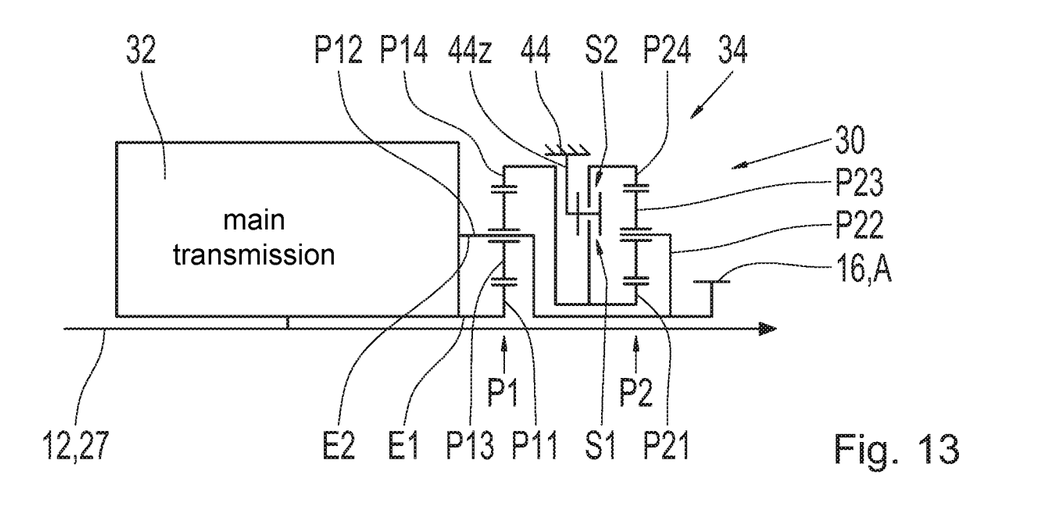

In the embodiment in accordance with FIG. 13, the reducer transmission 34 has the same effect as the reducer transmission 34 in FIG. 9. However, the first shift element S1 and the second shift element S2 are now arranged differently.

Both shift elements S1, S2 are now attached to a housing partition wall 44z.

In addition, the first shift element S1 is located radially within the second shift element S2. In other words, the first shift element S1 and the second shift element S2 are radially nested.

Figure 14:
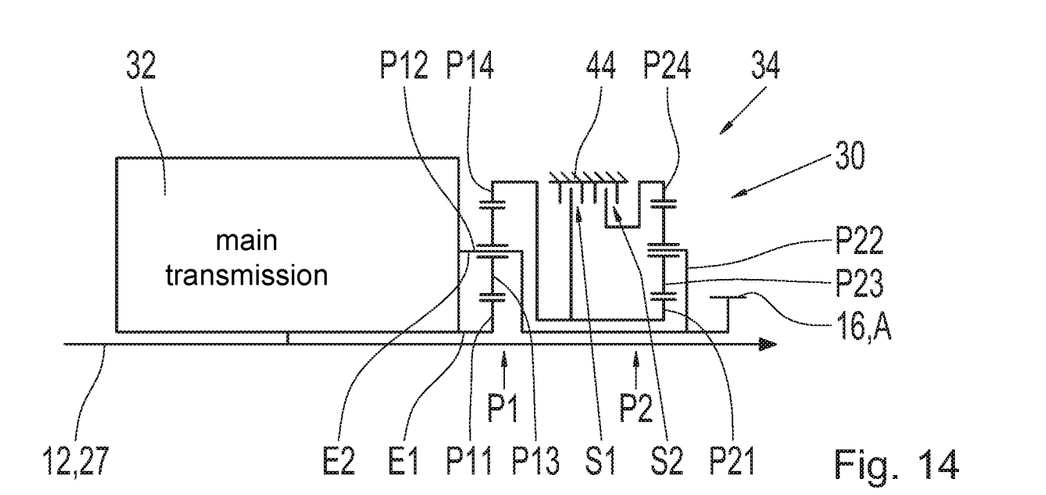

Also, the reducer transmission 34 of the embodiment in FIG. 14 corresponds to the reducer transmission 34 in FIG. 9 with regard to the components and the associated couplings. However, the two shift elements S1, S2 are now positioned directly adjacent to each other on the transmission housing 44.

In addition, the two shift elements S1, S2 are now positioned between the primary planetary gear set P1 and the secondary planetary gear set P2.

Figure 15:
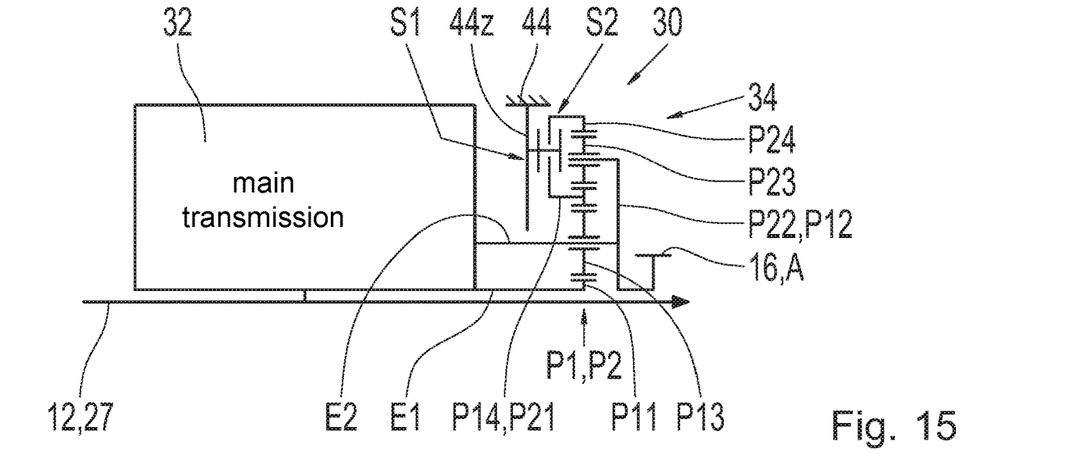

In the transmission assembly 30 as in FIG. 15, the reducer transmission 34 corresponds to the reducer transmission as in FIG. 10 with regard to its components and the respective couplings.

However, the shift elements S1, S2 are now mounted on an enclosure or partition wall 44z.

Hereby, the first shift element S1 is arranged radially within the second shift element S2. This configuration corresponds therefore with the radially nesting which has already been described in FIG. 13.

Figure 16:
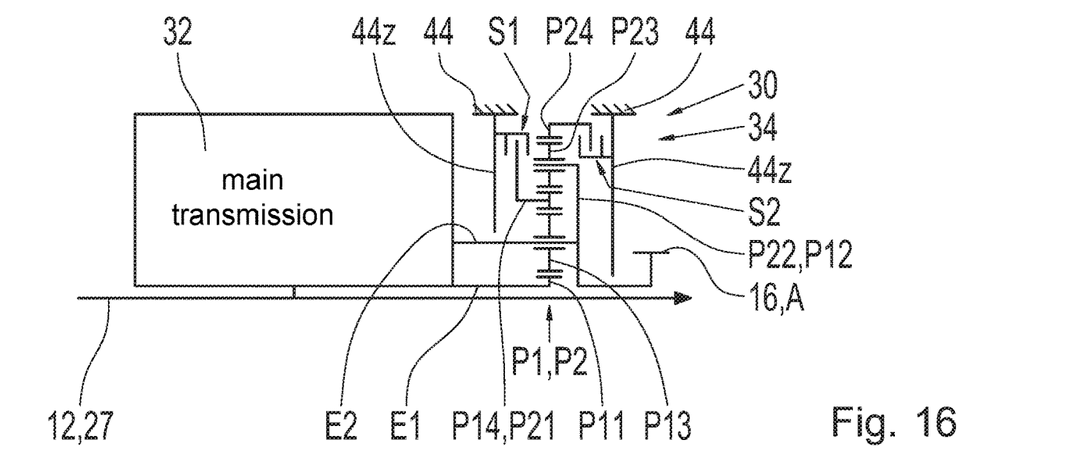

In the variation of FIG. 16, a reducer transmission 34 is implemented which corresponds, with regard to its components and respective couplings, to the reducer transmission 34 of FIG. 15. However, the first shift element S1 and the second shift element S2 are each mounted to a separate housing partition wall 44z.

In this case, the first shift element S1 is arranged, via the associated enclosure partition wall 44z, on the left hand side in the drawing of the planetary gear sets P1, P2, and the second shift element S2 is arranged, in the drawing, on the right side of the planetary gear sets P1, P2.

With regard to their radial position, the first shift element S1 and the second shift element S2 of located approximately at the same height.

Figure 17:
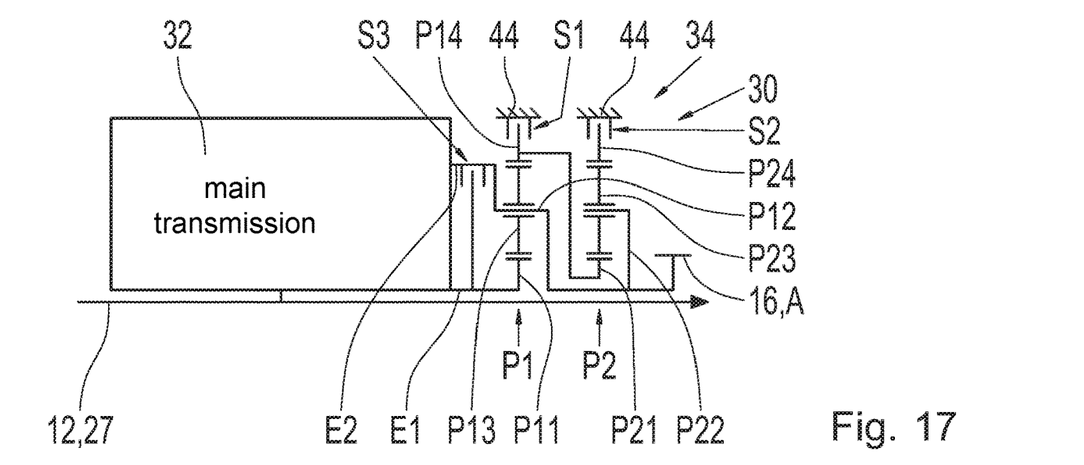
Figure 18:
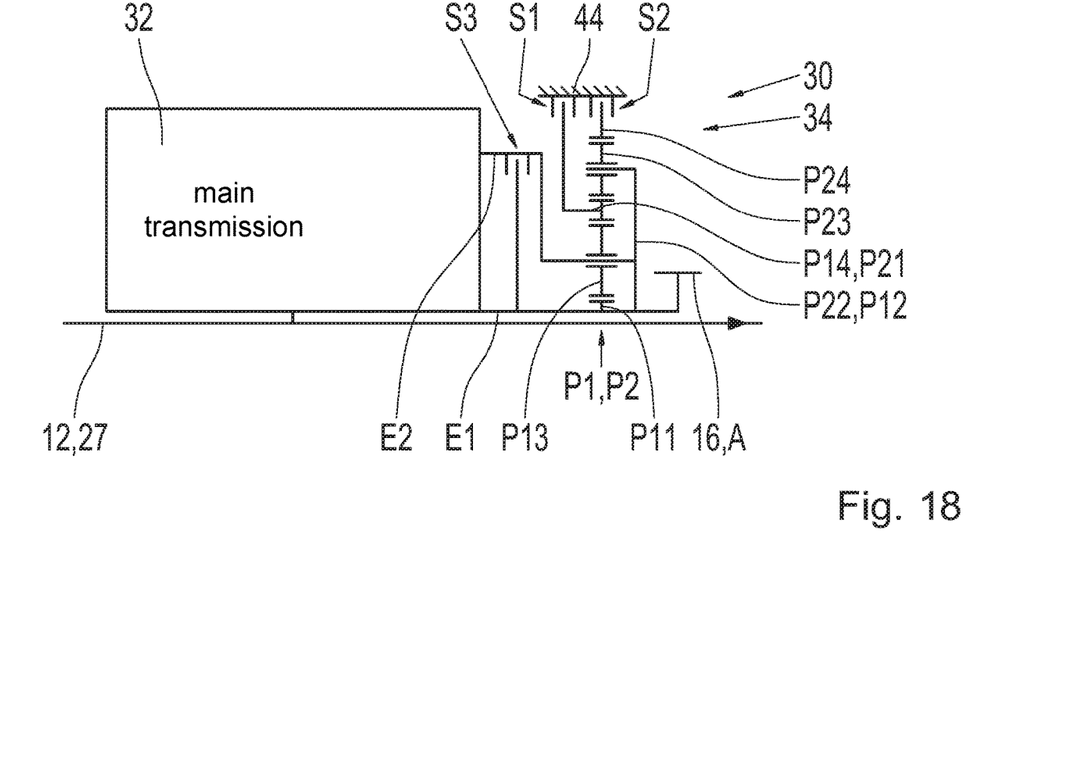

Additional embodiments of the transmission assembly 30 are presented in FIGS. 17 and 18. The third shift element S3, which has already been described in connection with the main transmission 32, is designed as an integral part of the reducer transmission 34.

Therefore, a reducer transmission 34 is shown in FIG. 17 which in its configuration corresponds with the reducer transmission 34 in FIG. 2. Via the third shift element S3, the primary planetary gear set P1 can be locked. Otherwise, it is described with reference to FIG. 2.

The reducer transmission 34 in FIG. 18 corresponds to the reducer transmission 34 in FIG. 4. The third shift element S3 is again assigned to the reducer transmission 34.

Consequently, two forward drive ranges FB-V1, FB-V2, and one reverse right range FB-R can be realized by means of the reducer transmission 34 as in FIGS. 17 and 18. A respective shifting schematic is presented in FIG. 19. The first forward drive range FB-V1 is hereby implemented when the first shift element S1 is engaged and all the remaining shift elements are disengaged.

Figure 19:
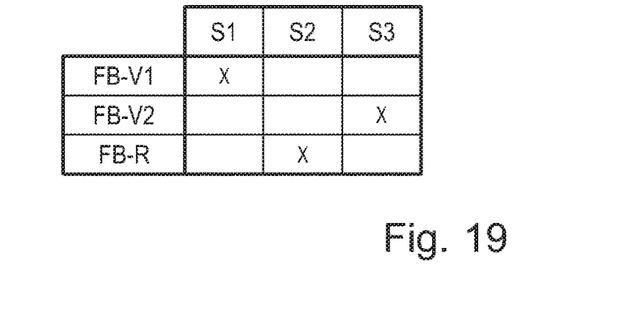

The second forward drive range FB-V2 is implemented when the third shift element S3 is engaged, meaning that the primary planetary gear set P1 is locked, and all remaining shift elements are disengaged.

The reverse drive range FB-R is implemented when the second shift element S2 is engaged. The remaining shift elements are then disengaged.

Such a reducer transmission 34 thus fulfills the functions of a reversing unit since it offers a forward drive range and a reverse drive range and also serves as a range group by offering two different forward drive ranges.

REFERENCE CHARACTERS

10 Powertrain
12 Main Transmission-Input Shaft
14 Power Take Off Transmission
16 Output Shaft
18 Front Wheel Drive
20 Rear Wheel Drive
22 Aggregates and Pumps
24 Drive Motor
26 Vibration Absorber
27 Transmission Axis
28 Power Split Transmission
30 Transmission Assembly
32 Main Transmission
34 Reducer Transmission
36 First Adjustment Unit
38 Second Adjustment Unit
40 Control Unit
42 Electrical Storage Unit
44 Transmission Housing
44z Housing Partition Wall
E1 First Input Shaft of the Reducer Transmission
E2 Second Input Shaft of the Reducer Transmission
A Output Shaft of the Reducer Transmission
P1 Primary Planetary Gear Set
P12 Primary Planet carrier
P13 Primary Planet Gear
P14 First Primary Planetary Gear Set Element
P2 Secondary Planetary Gear Set
P21 First Secondary Planetary Gear Set Element
P22 Second Secondary Planetary Gear Set Element
P23 Secondary Planet Gear
P23a Outer Planet Gear
P23i Inner Planet Gear
P24 Third Secondary Planetary Gear Set Element
P3 Tertiary Planetary Gear Set
P31 Tertiary Sun Gear
P32 Tertiary Planet carrier
P33 Tertiary Planet Gear
P34 Tertiary Ring Gear
P4 Quaternary Planetary Gear Set
P41 Quaternary Sun Gear
P42 Quaternary Planet carrier
P43 Quaternary Planet Gear
P44 Quaternary Ring Gear
P5 Quinary Planetary Gear Set
P51 Quinary Sun Gear
P52 Quinary Planet carrier
P53 Quinary Planet Gear
P54 Quinary Ring Gear
S1 First Shift Element
S2 Second Shift Element
S3 Third Shift Element
S4 Fourth Shift Element
S5 Fifth Shift Element
S6 Sixth Shift Element

The invention claimed is:
1. A transmission comprising:
a first input shaft which is couplable with a main transmission,
a second input shaft which is couplable with the main transmission,
a primary planetary gear set, in a power flow direction, having a primary sun gear, a primary planet carrier, with at least a primary planet gear, and a first primary planetary gear set element,
a secondary planetary gear set, downstream and following the primary planetary gear set, having a first secondary planetary gear set element, a second secondary planetary gear set element, and a third secondary planetary gear set element,
at least a first shift element and a second shift element, and an output shaft,
the first input shaft being rotationally fixedly connected to the primary sun gear,
the second input shaft being rotationally fixedly connected to the primary planet carrier,
the primary planet carrier being rotationally fixedly connected to the second secondary planetary gear set element, the output shaft being rotatably coupled to the second secondary planetary gear set element, the first primary planetary gear set element being rotationally fixedly connected to the first secondary planetary gear set element, the first primary planetary gear set element being connectable, in a rotationally fixed manner, to a transmission housing via the first shift element, the third secondary planetary gear set element being connectable, in a rotationally fixed manner, to the transmission housing via the second shift element, and the main transmission comprises:
  a main transmission-input shaft,
  a tertiary planetary gear set with a tertiary sun gear, a tertiary planet carrier, with at least one tertiary planet gear, and a tertiary ring gear,
  a quaternary planetary gear set with a quaternary sun gear, a quaternary planet carrier, at least one quaternary planet gear, and a quaternary ring gear,
  a fourth shift element, a fifth shift element, and a sixth shift element, and
  at least first and second adjustment units, which each are operationally connected to at least the one of the tertiary and the quaternary planetary gear sets of the main transmission.

2. The transmission according to claim 1, wherein the secondary planetary gear set is a minus planetary gear set, the second secondary planetary gear set element is a secondary planet carrier, and the third secondary planetary gear set element is a secondary ring gear.

3. The transmission according to claim 1, wherein the secondary planetary gear set is a plus planetary gear set, the second secondary planetary gear set element is a secondary ring gear, and the third secondary planetary gear set element is a secondary planet carrier.

4. The transmission according to claim 1, wherein the primary planet carrier and the secondary planet carrier are positioned next to each other along a transmission axis, the first primary planetary gear set element is a primary ring gear, and the first secondary planetary gear set element is a secondary sun gear.

5. The transmission according to claim 1, wherein the primary planetary gear set and the secondary planetary gear set are radially nested, with respect to a transmission axis, the first primary planetary gear set element and the first secondary planetary gear set element form an inner ring gear.

6. The transmission according to claim 1, wherein, with respect to a transmission axle, the first shift element is radially nested within the second shift element.

7. The transmission according to claim 1, wherein at least one of the first shift element and the second shift element is positioned along a transmission axis, between the primary planetary gear set and the secondary planetary gear set.

8. The transmission according to claim 1, wherein at least one of the first shift element and the second shift element is connected with the transmission enclosure, via an associated enclosure partition wall or a common enclosure partition wall.

9. The transmission according to claim 1, further comprising a third shift element, through which the primary planet carrier is rotatably connectable with the primary sun gear.

10. A transmission assembly comprising:
  a main transmission in a continuous power split transmission of a planetary design, and
  a reducer transmission being coupled with the main transmission, and the reducer transmission comprising a first input shaft which is couplable with a main transmission,
  a second input shaft being couplable with the main transmission,
  a primary planetary gear set, in a power flow direction, having a primary sun gear, a primary planet carrier, with at least a primary planet gear and a first primary planetary gear set element,
  a secondary planetary gear set, downstream and following the primary planetary gear set, having a first secondary planetary gear set element, a second secondary planetary gear set element, and a third secondary planetary gear set element,
  at least a first shift element and a second shift element, and an output shaft,
  the first input shaft being rotationally fixedly connected to the primary sun gear,
  the second input shaft being rotationally fixedly connected to the primary planet carrier,
  the primary planet carrier being rotationally fixedly connected to the second secondary planetary gear set element,
  the output shaft being rotatably coupled to the second secondary planetary gear set element,
  the first primary planetary gear set element being rotationally fixedly connected to the first secondary planetary gear set element,
  the first primary planetary gear set element being connectable, in a rotationally fixed manner, to a transmission housing via the first shift element,
  the third secondary planetary gear set element being connectable, in a rotationally fixed manner, to the transmission housing via the second shift element, and
  the main transmission comprises:
    a main transmission-input shaft,
    a tertiary planetary gear set with a tertiary sun gear, a tertiary planet carrier, with at least one tertiary planet gear, and a tertiary ring gear,
    a quaternary planetary gear set with a quaternary sun gear, a quaternary planet carrier, at least one quaternary planet gear, and a quaternary ring gear,
    a fourth shift element, a fifth shift element, and a sixth shift element, and
    at least first and second adjustment units, which each are operationally connected to at least the one of the tertiary and the questernary planetary gear sets of the main transmission.

11. The transmission assembly according to claim 10, wherein the main transmission-input shaft is rotationally fixedly connected to the quaternary planet carrier, the first adjustment unit is rotationally fixedly connected to the tertiary sun gear and the quaternary sun gear, the second adjustment unit is rotationally fixedly connected to the tertiary planet carrier, the tertiary ring gear is rotationally fixedly connected to the quaternary planet carrier, the second adjustment unit is rotatably couplable, via the fourth shift element, to the primary planet carrier, the quaternary ring gear is rotatably couplable, via the fifth shift element, to the primary sun gear, and the second adjustment unit is rotatably couplable, via the sixth shift element, to the primary sun gear.

12. The transmission assembly according to claim 10, wherein the main transmission comprises a quinary planetary gear set with a quinary sun gear and at least one quinary ring gear, a quinary planet carrier and at least one quinary planet gear,     the main transmission-input shaft is rotationally fixedly connected to the tertiary ring gear and the quaternary planet carrier,     the quaternary sun gear and the quinary sun gear are is rotationally fixedly connected,     the first adjustment unit is rotationally fixedly connected to the main transmission-input shaft,     the second adjustment unit is rotationally fixedly connected to the tertiary sun gear,     the tertiary planet carrier is rotationally fixedly connected to the quaternary ring gear and the quinary planet carrier,     at least one of the quinary planet carrier, the quaternary ring gear and the tertiary planet carrier is connectable, or is connected in a rotationally fixed manner, to the primary planet carrier via the fourth shift element,     the quinary sun gear is connectable in a rotationally fixed manner, via the fifth shift element, to the primary sun gear, and     the quinary ring gear is connectable in a rotationally fixed manner, via the sixth shift element, to the primary sun gear.

13. The transmission assembly according to claim 12, wherein, along a transmission axis, the primary, the secondary, the tertiary, the quaternary and the quinary planetary gear sets are positioned in an order of: the tertiary planetary gear set, the quaternary planetary gear set, the primary planetary gear set, and the secondary planetary gear set, and     the quinary planetary gear set is positioned between the quaternary planetary gear set and the primary planetary gear set.

14. A powertrain of a mobile work machine, with a transmission assembly comprising:

a main transmission in a continuous power split transmission of a planetary design, and     a reducer transmission being coupled with the main transmission, and the reducer transmission comprising:

a first input shaft which is couplable with a main transmission,         a second input shaft which is couplable with the main transmission,         a primary planetary gear set, in a power flow direction, having a primary sun gear, a primary planet carrier, with at least a primary planet gear and a first primary planetary gear set element,         a secondary planetary gear set, downstream and following the primary planetary gear set, having a first secondary planetary gear set element, a second secondary planetary gear set element, and a third secondary planetary gear set element,         at least a first shift element and a second shift element, and an output shaft,         the first input shaft being rotationally fixedly connected to the primary sun gear,         the second input shaft is being rotationally fixedly connected to the primary planet carrier,         the primary planet carrier being rotationally fixedly connected to the second secondary planetary gear set element,         the output shaft being rotatably coupled to the second secondary planetary gear set element,         the first primary planetary gear set element being rotationally fixedly connected to the first secondary planetary gear set element,         the first primary planetary gear set element being connectable, in a rotationally fixed manner, to a transmission housing via the first shift element,         the third secondary planetary gear set element being connectable, in a rotationally fixed manner, to the transmission housing via the second shift element, and     the main transmission comprises:

a main transmission-input shaft,         a tertiary planetary gear set with a tertiary sun gear, a tertiary planet carrier, with at least one tertiary planet gear, and a tertiary ring gear,         a quaternary planetary gear set with a quaternary sun gear, a quaternary planet carrier, at least one quaternary planet gear, and a quaternary ring gear,         a fourth shift element, a fifth shift element, and a sixth shift element, and         at least first and second adjustment units, which each are operationally connected to at least the one of the tertiary and the quaternary planetary gear sets of the main transmission.

\* \* \* \* \*